United States Patent [19]

Kipple et al.

[11] 4,023,943

[45] May 17, 1977

[54] FILTER SYSTEM

[75] Inventors: Harry P. Kipple, Pittsburgh; Roger J. Alke, Wexford; John R. Coppage, Pittsburgh; Charles E. Price, Pittsburgh; Brian J. Sturman, Jr., Pittsburgh, all of Pa.

[73] Assignee: Westinghouse Electric Corporation, Pittsburgh, Pa.

[22] Filed: Mar. 8, 1976

[21] Appl. No.: 665,135

[52] U.S. Cl. .................................. 55/304; 55/467; 118/603
[51] Int. Cl.² ..................................... B01D 46/04
[58] Field of Search ............... 55/96, 97, 304, 305, 55/341, 350, 385 A, 467, 483, 484, DIG. 29; 98/115 SB; 118/603

[56] References Cited

UNITED STATES PATENTS

| | | | |
|---|---|---|---|
| 1,898,424 | 2/1933 | Collins | 55/350 |
| 2,035,400 | 3/1936 | Paine | 55/341 NT |
| 2,335,315 | 11/1943 | Seymour | 55/305 |
| 3,395,519 | 8/1968 | Kleissler | 55/304 |
| 3,719,030 | 3/1973 | Blankemeyer et al. | 55/97 |
| 3,808,776 | 5/1974 | Jesernig et al. | 55/300 |

FOREIGN PATENTS OR APPLICATIONS

| | | | |
|---|---|---|---|
| 778,537 | 7/1957 | United Kingdom | 55/97 |

*Primary Examiner*—Bernard Nozick
*Attorney, Agent, or Firm*—L. P. Johns

[57] ABSTRACT

An air filter system for filtering solid particles from air, characterized by a plurality of flexible filter tubes having walls permeable to air and impermeable to solid particles, and mechanical means for shaking the filter tubes to dislodge any deposited solid particles from the tubes which means comprises a vibrating structure.

4 Claims, 4 Drawing Figures

U.S. Patent  May 17, 1977  Sheet 2 of 2  4,023,943

FILTER SYSTEM

BACKGROUND OF THE INVENTION

1. Field of the Invention

This invention relates to an air filter system for environmental control.

2. Description of the Prior Art

Environmental control of air to eliminate or minimize the existance of pollutants, such as noxious materials, is necessary. Various means for achieving pollution control of both air and water are known and in use. Because of the magnitude of types of pollutants incurred by manufacturing processes many different devices are necessary and depend upon the physical and/or chemical properties of the pollutant material. One of the more predominate types of pollutants is fine powder or dust that emanates from many manufacturing plants which should be eliminated from an atmosphere.

SUMMARY OF THE INVENTION

It has been found that in accordance with this invention that an air filter system is available for filtering solid particles from air which system comprises a housing enclosing a compartment, a chamber, and a receptacle, a partition in the housing separating the compartment and chamber, a wall in the housing separating the chamber and the receptacle, the partition and wall having corresponding openings, a flexible filter tube extending through the chamber between each pair of corresponding openings in the partition and in the wall, the housing having an ambient air inlet and an exhaust air outlet communicating with the chamber, air inlet means for conducting a mixture of air and particles into the compartment, and shaking means for shaking the filter tubes to dislodge any deposited solid particles from the filter tubes and comprising a vibrating structure and rigid members extending mediately between the vibrating structure and the filter tubes.

The advantage of the device of this invention is that very small air polluting particles having sizes of from 0.3 to 20 microns may be filtered from ambient air and the material may be reclaimed for reuse.

DESCRIPTION OF THE PREFERRED EMBODIMENT

Figure 1:
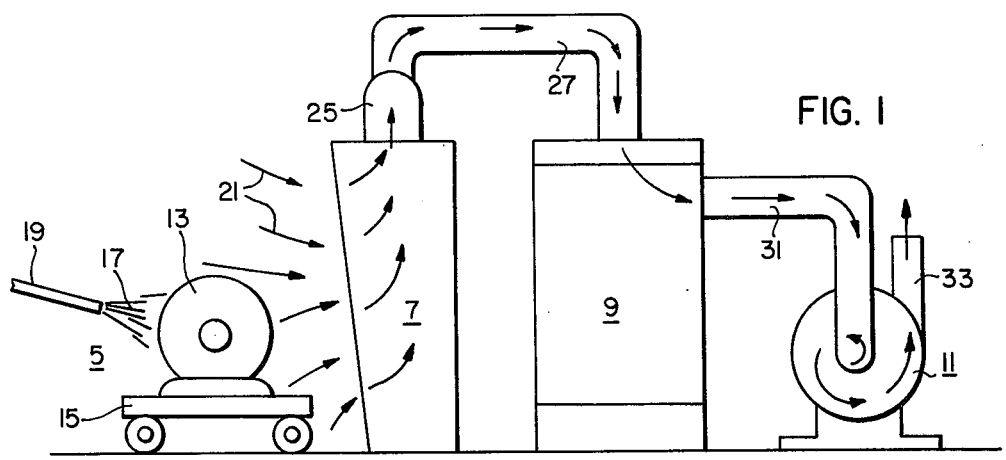
FIG. 1 is a diagrammatic side view of the air filtering system of this invention.

In FIG. 1 the powder filtering system of this invention is shown schematically and it consists of workplace generally indicated at 5, a spray booth or vent 7, a bag house 9, and an exhaust fan 11. The workplace 5 comprises any area where air polluting powder is diffused or disseminated into the surrounding atmosphere as a result of the application of the powder to a workpiece. For example, in FIG. 1 an electric motor 13 is mounted on a cart 15 and is covered with a coating of a thermosetting resin 17, such as a phenolic resin, which is sprayed onto the motor housing in a conventional manner, such as by a hand manipulated nozzle 19, on the end of a hose (not shown) leading from a source of the powdered resin. During the spraying process the powder particles, having a size of from about 0.3 to 20 microns disseminates into the surrounding ambient air in undesirable quantities. For that reason the spraying process is conducted near the spray booth 7, whereby the powder-laden air is sucked as indicated by arrows 21 into the spray booth.

Figure 2:
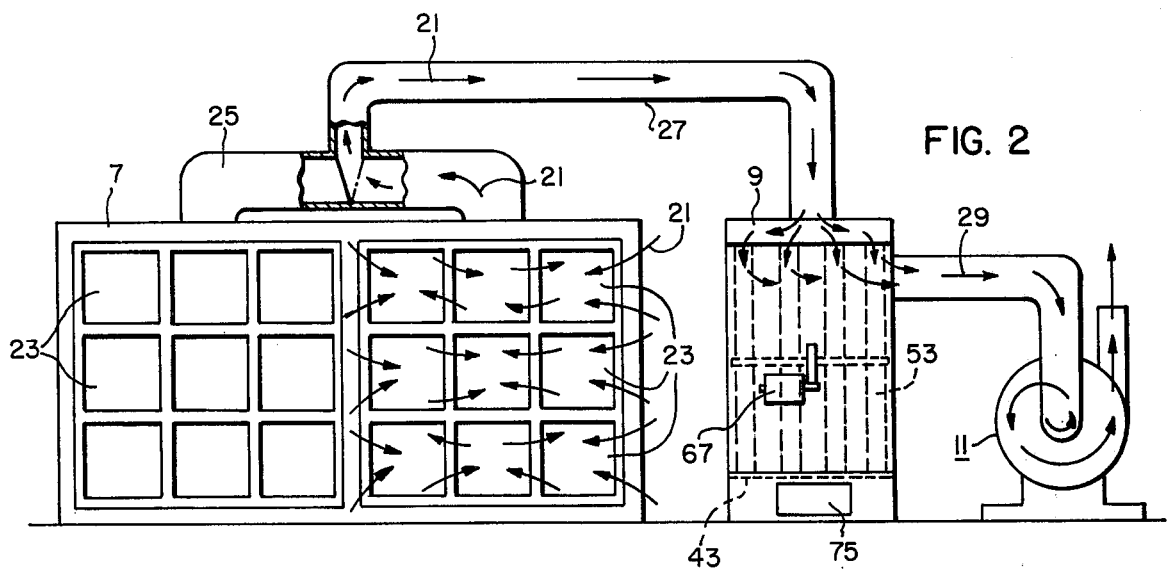
FIG. 2 is a diagrammatic front view of the air filter system.

The booth 7 (FIG. 2) preferably consists of two sides and the outer face includes a plurality of rectangular filters 23 which are detachably mounted in place. As the powder-laden air passes through the filters 23, it enters a plenum chamber with the booth from where it is drawn into a manifold conduit 25 and thence to a collecting conduit 27. One side or the other of the spray booth may be used as desired by the provision of an adjustable baffle (not shown) in the manifold conduit 25 near the collecting conduit 27 in a conventional manner. The powder-laden air 21 then moves into the bag house 9 where the powder 17 is filtered from the air and the filtered air 29 proceeds through a conduit 31 to the exhaust fan and thence through an outlet 33 to the atmosphere.

Figure 3:
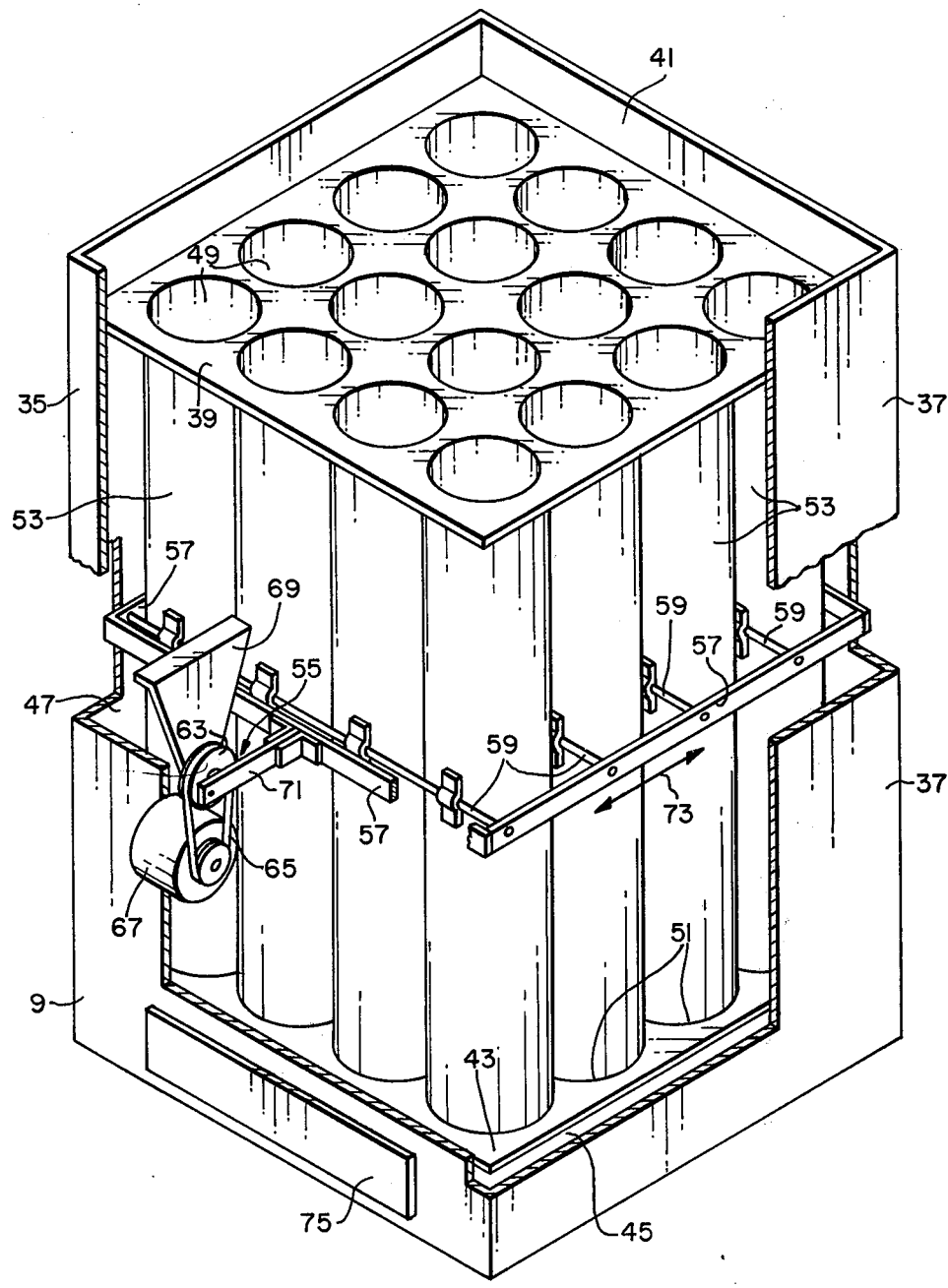
FIG. 3 is a perspective view of the filter bag house.

As shown more particularly in FIG. 3, the bag house 9 is a box-like structure having outer walls 35, 37. A partition 39 extends horizontally across the upper portion of the structure to provide an upper compartment 41. Likewise, a wall 43 extends across the lower portion of the housing to provide a receptacle 45. A filter chamber 47 is disposed between the compartment 41 and the receptacle 45. The partition 39 and the wall 43 are each provided with a plurality of spaced openings 49 and 51, respectively. Each opening 49 in the partition 39 is aligned with a corresponding opening 51 in the wall 43. Corresponding openings 49, 51 are preferably vertically aligned. A filter tube 53 extends between each pair of corresponding openings 49, 51 and is secured to the partition 39 and wall 51 in the air tight manner. The filter tubes 53 are flexible members and preferably consist of a woven fabric through which the air may pass, but which are sufficiently small to prevent the passage of powder particles. The powder-laden air 21 enters the upper compartment 41, passes downwardly through the several tubes 53 from where it passes outwardly through the walls leaving the powder particles deposited on the inner surface of the filter tubes. From the filter chamber 47 the air moves through the conduit 31 to the exhaust fan and then into the atmosphere.

As the powdered resin 17 accumulates on the surface of the filter tubes 53 it is ultimately desirable to shake the tubes in order to maintain the filter characteristics of the tubes. For that purpose, shaking means 55 (FIG. 3) are provided which comprise a rectangular frame 57 within the outer walls 35, 37 and surrounding the several filter tubes 53. The shaking means 55 also includes a plurality of spaced rods 59 extending between opposite sides of the frame 57. The number of rods 59 is comparable to the number of rows of filter bags 53. Each rod 59 extends along the other side of a row of filter bags 53 and is attached thereto by a tab 61.

Figure 4:
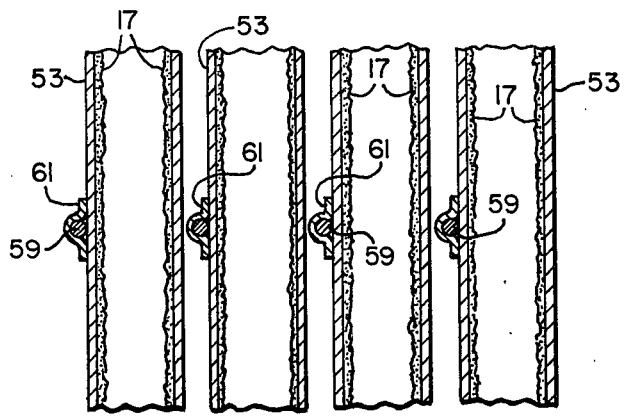
FIG. 4 is a fragmentary vertical sectional view of FIG. 3.

As shown in FIG. 4 each tab 61 has upper and lower end portions which are sewn or stiched to the outer surface of each filter tube 53 and the intermediate portion of each tab is looped around the corresponding rod 59. Thus, each filter tube 53 is attached to a rod 59. Moreover, since opposite ends of each rod 59 are secured to opposite sides of the frame 57, the rods and the frame are supported in place by the several filter tubes 53. The shaking means 55 also includes an eccentric wheel 63 having a peripheral gear which is driven by a chain 65 by a motor 67. The eccentric wheel 63 is mounted in place on the housing by a mounting member 69. A link 71 extends between the eccentric wheel 63 and the frame 57 so that when the eccentric wheel rotates the frame vibrates horizontally back and forth, as indicated by the arrow 73, thereby shaking the flexible filter tubes 53 to cause the accumulated powdered resin 17 (FIG. 4) to be dislodged from the filter tubes and drop to the receptacle 45 where an access door 75 is provided for its periodic removal.

It is preferred that the exhaust system be turned off when the shaking process is performed in order to achieve maximum removal of the powdered resin. For maximum efficiency when the filtering system reaches the point of saturation, the equipment is turned off and the filter bags are shaken down. The powder is recovered in the receptacle for reuse. Cleaning or shaking of the bags normally occurs once or twice a month for about 3 seconds depending upon the activity and use of the exhaust system. By recycling the clean air into a surrounding shop and not exhausting the air back into the atmosphere outside of a shop heat may be saved and thereby conserve energy as far as heating the shop is concerned.

What is claimed is:

1. A powder filtering system for environmental control at a workplace vent where powdered particles are diffused into ambient air, said system comprising suction means adjacent to the workplace for venting off any particle-laden ambient air from the workplace, the suction means comprising an air filter structure including a housing enclosing a compartment, a chamber, and a receptacle, a partition in the housing and separating the compartment and the chamber, a wall in the housing and separating the chamber and the receptacle, the partition and the wall having corresponding openings, air inlet means for introducing particle-laden air into the compartment and exhaust air outlet means communicating with the chamber for removing filtered air from the chamber, a conduit extending between the workplace vent and the air inlet, the air filter also comprising flexible tubular filters extending between corresponding openings in the partition and the wall, each tubular filter being composed of flexible material, means for shaking the tubular filter to dislodge deposited powder particles from the walls of the tubular filter and into the receptacle, the shaking means comprising a vibrating structure, a rigid frame within the chamber and around the tubular filters, and spaced rods extending across the frame and between the filters, and each tubular filter being separately attached to one of the spaced rods.

2. The powder filter system of claim 1 in which the tubular filter is a woven fabric.

3. The powder filter system of claim 1 in which the compartment is above the chamber and the receptacle is below the chamber.

4. The powder filtering system of claim 3 in which the tubular filter extends substantially vertically between the compartment and the receptacle.

* * * * *